(12) United States Patent
Fanska et al.

(10) Patent No.: US 9,395,604 B1
(45) Date of Patent: Jul. 19, 2016

(54) CAMERA ADJUSTMENT TOOL AND METHOD

(71) Applicant: Rosemount Aerospace Inc., Burnsville, MN (US)

(72) Inventors: Joseph M. Fanska, Lakeville, MN (US); Kaleb Anderson, Goodhue, MN (US); Wallace Johnson, Prior Lake, MN (US); Kenneth Freeman, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 14/731,452

(22) Filed: Jun. 5, 2015

(51) Int. Cl.
*G03B 17/00* (2006.01)
*G03B 17/56* (2006.01)
*B64D 47/08* (2006.01)

(52) U.S. Cl.
CPC .............. *G03B 17/561* (2013.01); *B64D 47/08* (2013.01)

(58) Field of Classification Search
USPC ......................................................... 396/427
See application file for complete search history.

(56) References Cited

U.S. PATENT DOCUMENTS

| | | | | |
|---|---|---|---|---|
| 4,884,145 A * | 11/1989 | Kaye | .................... | H04N 5/2253 345/7 |
| 5,592,331 A | 1/1997 | Eastcott | | |
| 6,864,805 B1 * | 3/2005 | Gomez | .............. | B64D 45/0015 340/945 |
| 7,534,057 B2 * | 5/2009 | Jones | ..................... | F16M 11/10 248/178.1 |
| 7,792,189 B2 * | 9/2010 | Finizio | ............... | B64D 45/0015 348/148 |
| 8,233,043 B2 * | 7/2012 | Washington | ....... | G06K 7/10079 348/143 |
| 8,249,444 B2 * | 8/2012 | Peterson | ................ | G03B 17/55 348/151 |
| 8,325,232 B2 * | 12/2012 | Lee | ..................... | B64D 45/0015 348/148 |
| 8,515,656 B2 * | 8/2013 | Reed | ........................ | B64D 9/00 244/137.1 |
| 8,678,676 B2 * | 3/2014 | Scholz | ..................... | G03B 5/02 396/342 |
| 2003/0117494 A1 * | 6/2003 | Poblete | .............. | B64D 45/0015 348/148 |
| 2008/0056709 A1 * | 3/2008 | Huang | ................... | G03B 17/56 396/427 |
| 2015/0198866 A1 * | 7/2015 | Huang | ................. | G03B 17/561 348/151 |

\* cited by examiner

*Primary Examiner* — Clayton E Laballe
*Assistant Examiner* — Warren K Fenwick
(74) *Attorney, Agent, or Firm* — Kinney & Lange, P.A.

(57) ABSTRACT

A camera adjustment mechanism allows a user to adjust the orientation of a surveillance camera. The camera adjustment mechanism includes a first portion and a second portion. The first portion includes a first end, a second end, and a first wall that extends between and connects the first end and the second end. The first wall is sloped such that an inner diameter of the first end is greater than an inner diameter of the second end. The second portion includes a third end connected to the second end, a fourth end, a second wall extending between and connecting the third end and the fourth end, and a plurality of engagement openings extending circumferentially about the fourth end.

18 Claims, 4 Drawing Sheets

CAMERA ADJUSTMENT TOOL AND METHOD

BACKGROUND

This disclosure relates generally to surveillance systems, and more particularly to orienting the cameras within the surveillance system.

Surveillance systems, such as aircraft surveillance systems, utilize cameras mounted within wall panels on the aircraft. The camera is housed within a camera housing, which is fit within a camera cup. The camera cup is mounted within the aircraft panel by a retainer clip. The camera and camera housing are initially mounted within the aircraft panel before the security and electronics systems of the aircraft have come online. As such, the view initially broadcast by the camera may not be optimally aligned vertically, horizontally, or rotationally. After the security and electronics systems of the aircraft come online, the camera must be adjusted to broadcast the desired view. Cameras also have to be adjusted throughout the lifetime of the camera, as the camera housing can drift within the camera cup, due to vibrations experienced from the aircraft. A user cannot easily access the camera housing to adjust the view of the camera because the camera housing is secured within the wall panel by the camera cup. As such, an adjustment tool is necessary to adjust the camera housing, which thereby adjusts the orientation of the camera.

SUMMARY

According to an embodiment of the present disclosure, a camera adjustment mechanism includes a first portion and a second portion. The first portion includes a first end, a second end, and a first wall that extends between and connects the first end and the second end. The first wall is sloped such that an inner diameter of the first end is greater than an inner diameter of the second end. The second portion includes a third end connected to the second end, a fourth end, a second wall extending between and connecting the third end and the fourth end, and a plurality of engagement openings extending circumferentially about the fourth end.

According to another embodiment of the present disclosure, a surveillance system includes at least one camera cup mounted within a wall, at least one camera housing movably disposed within the at least one camera cup, at least one camera mounted within the at least one camera housing, and a camera adjustment mechanism capable of orienting a field of view of the at least one camera. The camera housing includes an inner surface, an outer surface, a rim, and a plurality of projections disposed circumferentially about the inner surface of the camera housing. The camera adjustment mechanism includes a first portion and a second portion. The first portion includes a first end, a second end, and a first wall that extends between and connects the first end and the second end. The second portion includes a third end connected to the second end, a fourth end, a second wall extending between and connecting the third end and the fourth end, and a plurality of engagement openings extending circumferentially about the fourth end. The plurality of engagement openings configured to engage the plurality of projections.

According to yet another embodiment of the present disclosure, a method of camera adjustment for an aircraft cabin surveillance system includes determining an initial camera orientation, aligning a plurality of engagement notches with a plurality of engagement posts, the engagement notches disposed circumferentially about a distal end of the camera adjustment mechanism and the engagement posts disposed circumferentially around an interior surface of the camera housing, meshing the plurality of engagement notches with the plurality of engagement posts, and adjusting the initial camera orientation to a preferred camera orientation.

DETAILED DESCRIPTION

Figure 1:
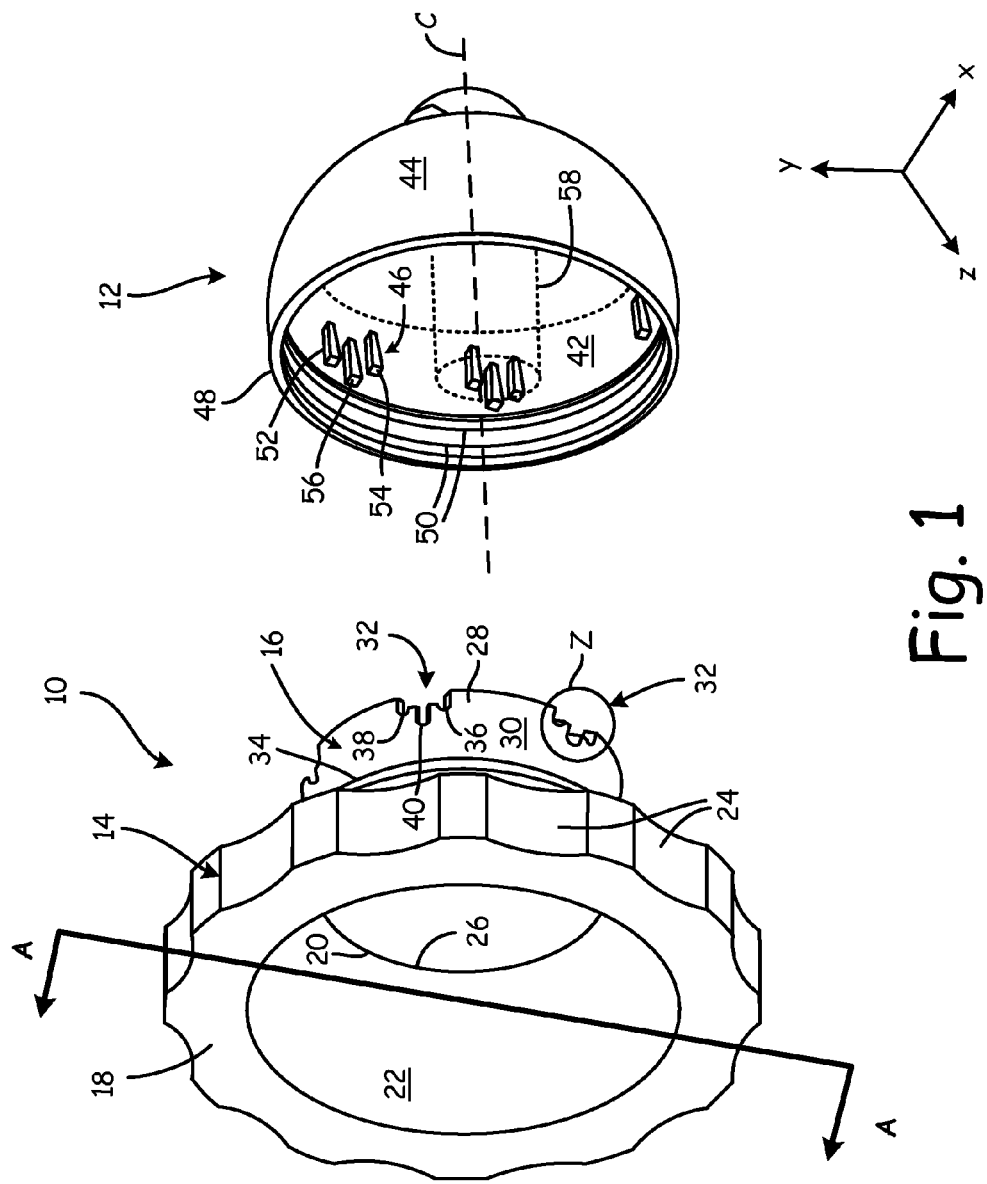
FIG. 1 is an exploded perspective view of a camera adjustment mechanism and a camera housing.

FIG. 1 is an exploded perspective view of camera adjustment mechanism 10 and camera housing 12. Camera adjustment mechanism 10 includes first portion 14 and second portion 16. First portion 14 includes first end 18, second end 20, first wall 22, and grips 24. Second portion 16 includes third end 26, fourth end 28, second wall 30, engagement openings 32, and shoulder 34. Engagement opening 32 includes first notch 36, second notch 38, and third notch 40. Camera housing 12 includes inner wall 42, outer wall 44, projections 46, rim 48, and grooves 50. Projections 46 include first post 52, second post 54, and third post 56.

Grips 24 extend circumferentially around an outer edge of first end 18. First wall 22 extends between and connects first end 18 and second end 20. Second end 20 is connected to third end 26 to connect first portion 14 and second portion 16. Second wall 30 extends between and connects third end 26 and fourth end 28. Shoulder 34 extends circumferentially about an outer edge of second wall 30. Engagement openings 32 are disposed circumferentially about fourth end 28.

Camera housing 12 is generally hemispherical with an open end. Grooves 50 extend about inner wall 42 near rim 48. Grooves 50 provide a snap fit connection for a lens cap to be mounted to camera housing 12. Projections 46 are disposed circumferentially about inner wall 42. First post 52, second post 54, and third post 56 are each attached to inner wall 42 and extend axially from the open end of camera housing 12.

Camera housing 12 is configured to house camera 58, such as a security camera used in an aircraft cabin security system. Camera 58 is positioned within camera housing 12 along axis C and projects towards an open end of camera housing 12. Camera housing 12 can to be adjusted throughout the Cartesian coordinate system to orient camera 58, while also preventing the camera housing 12 from drifting within a camera cup (shown in FIG. 2) during operation. Camera 58 is not initially powered when camera 58 and camera housing 12 are mounted in the camera cup. Therefore, camera 58 must be oriented after the security system is activated. Camera adjustment mechanism 10 can also reorient camera 58 when the orientation of camera 58 drifts due to vibrations experienced by the camera cup and the friction fit between camera housing 12 and the camera cup.

Camera housing 12 is adjusted with camera adjustment mechanism 10, to properly orient camera 58. Security system is activated and a view from camera 58 is transmitted to a user. The user removes a lens cap from camera housing 12, and the user inserts camera adjustment mechanism 10 into camera housing 12. Each engagement opening 32 meshes with a projection 46 as first notch 36 receives first post 52, second notch 38 receives second post 54, and third notch 40 receives third post 56. In the illustrated embodiment, third notch 40 has a greater axial length that first notch 36 and second notch 38. The greater axial length of third notch 40 allows third notch 40 to engage third post 56 (shown in FIG. 1), as third post 56 is axially offset, towards third end 26, as compared to first post 52 and second post 54.

While engagement opening 32 is described as including first notch 36, second notch 38, and third notch 40, it is understood that that engagement openings 32 may take any suitable form to mesh with projections 46, such as a rectangular opening without notches, or a series of notches without a common engagement opening. Additionally, while third notch 40 is described as having a greater axial length than first notch 36 and second notch 38, it is understood that first notch 36, second notch, 38, and third notch 40 may all have the same axial length, or may have axial lengths that vary in any desired manner. It is further understood that while engagement opening 32 is described as including three notches, engagement opening 32 may include any desired number of notches suitable for engaging projection 46. For example, if projection 46 includes four posts, then engagement opening 32 may correspondingly include four notches. Similarly, while third post 56 is described as axially offset from first post 52 and second post 54, it is understood that the notches of adjusting feature 46 may all have the same axial displacement, may be of differing axial lengths, and may vary in any manner such that projection 46 is capable of meshing with engagement opening 32. In addition, while projection 46 is described as including first post 52, second post 54, and third post 56, it is understood that projection 46 may include more or less posts as desired and may take any form suitable for engaging a corresponding engagement opening 32. For example, projection 46 may be triangularly shaped with an apex pointing towards third side 26, and engagement opening 32 would then also have a triangular shape to engage projection 46.

Shoulder 34 abuts rim 48 when camera adjustment mechanism 10 engages camera housing 12. Shoulder 34 laying flush against rim 48 indicates that the engagement openings 32 are fully engaged with projections 46. In this way, shoulder 34 acts as a mistake-proofing feature to ensure that camera adjustment mechanism 10 is properly aligned with camera 58 during camera adjustment, which ensures that the camera is properly oriented after adjustment. In addition, shoulder 34 limits the distance that second portion 16 can extend into camera housing 12 to prevent any inadvertent damage occurring to camera 58 or to any elements of the camera.

Camera 58 extends through second portion 16 when camera adjustment mechanism 10 is engaged with camera housing 12. First wall 22 of first portion 14 defines a maximum field of view (FOV) that can be seen by camera 58 when camera adjustment mechanism 10 is engaged. The FOV provided by first portion 14 is preferably greater than a FOV of the camera. As such, the FOV provided through first portion 14 is preferably greater than about 90 degrees, and more particularly is preferably between about 90 degrees and about 110 degrees. Providing a greater FOV through first portion 14 ensures that the user can see the full FOV of camera 58 while camera adjustment mechanism 10 is engaged with camera housing 12, which enables more efficient camera orientation. In this way, the user adjusting camera 58 does not have to continually remove the camera adjustment mechanism to determine the FOV of camera 58 during orientation. Instead, the user can see the entire FOV of camera 58 throughout the orientation process, even when camera adjustment mechanism 10 is engaged with camera housing 12.

Figure 1A:
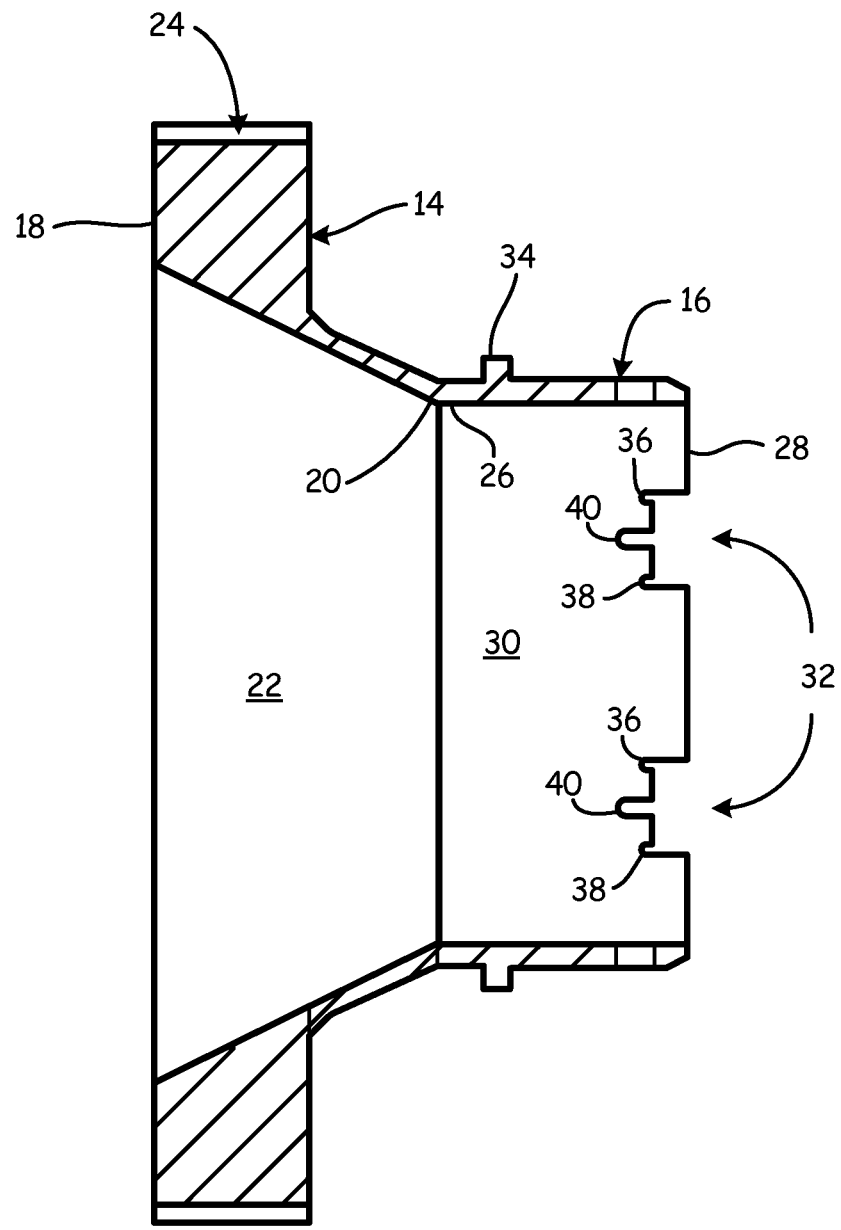
FIG. 1A is a cross-sectional view of a camera adjustment mechanism taken along line A-A of FIG. 1.

FIG. 1A is a cross-sectional view of camera adjustment mechanism 10 taken along line A-A of FIG. 1. Camera adjustment mechanism 10 includes first portion 14 and second portion 16. First portion 14 includes first end 18, second end 20, first wall 22, and grips 24. Second portion 18 includes third end 26, fourth end 28, second wall 30, engagement openings 32, and shoulder 34. Engagement openings 32 include first notch 36, second notch 38 and third notch 40.

Grips 24 extend circumferentially around an outer edge of first end 18. Grips 24 allow a user to easily grasp and manipulate first end 18. First wall 22 extends between and connects first end 18 and second end 20. In the illustrated embodiment, first wall 22 is an angled wall, such that an internal diameter of first end 18 is greater than an internal diameter of second end 20. Second end 20 is connected to third end 26, to connect first portion 14 and second portion 16. Second wall 30 extends between and connects third end 26 and fourth end 28. As shown, fourth end 28 can include a sloped edge. Shoulder 34 extends circumferentially about an outer edge of second wall 30. Engagement openings 32 are disposed circumferentially about fourth end 28. First notch 36 extends towards third end 26 along second wall 30. Second notch 38 similarly extends towards third end 26 along second wall 30. Third notch 40 is disposed between first notch 36 and second notch 38, and similarly extends into second wall 30 towards third end 26.

Figure 2:
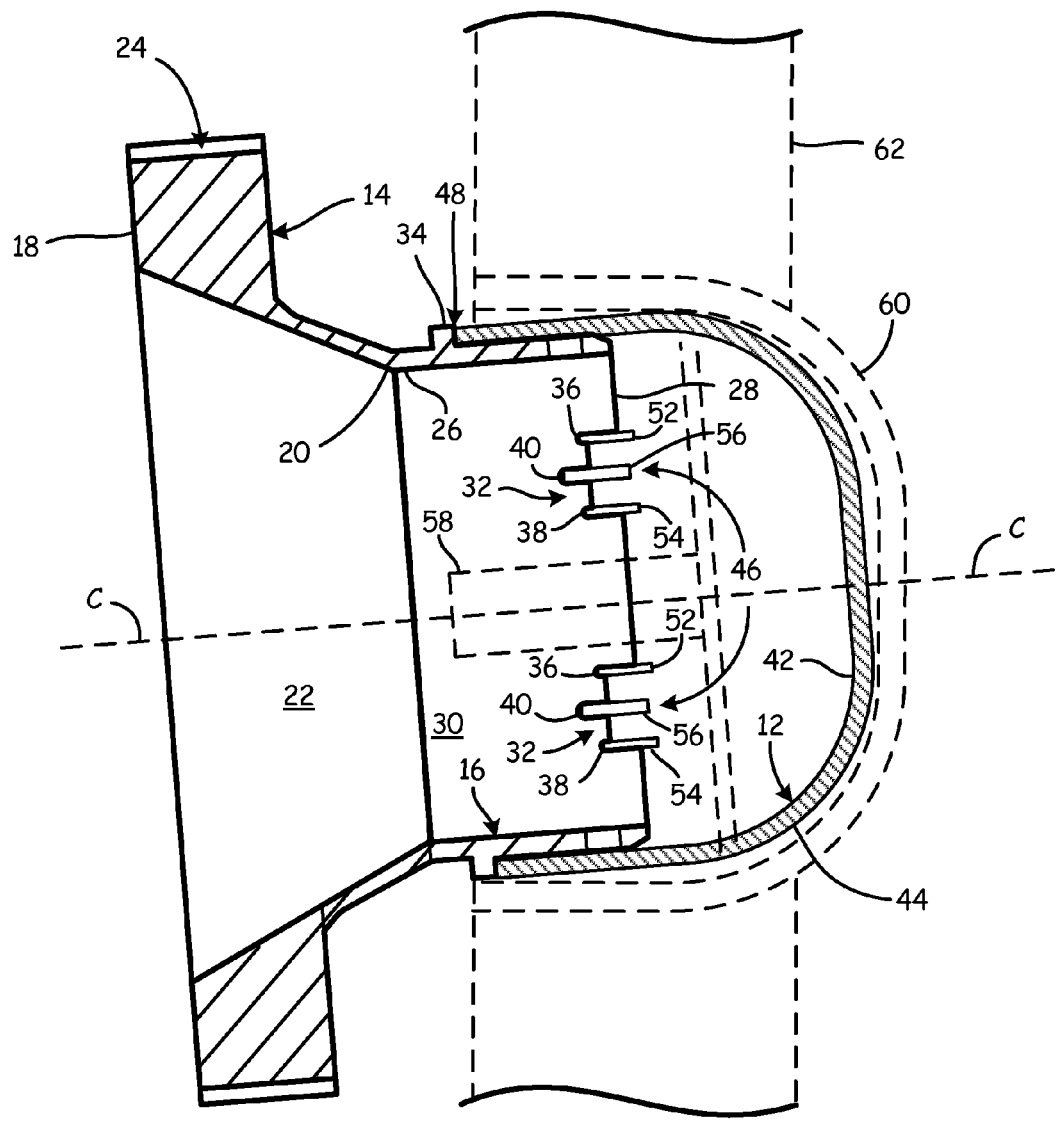
FIG. 2 is a cross-sectional view of a camera adjustment mechanism engaged with a camera housing.

Engagement openings 32 are configured to mesh with projections 46 (best seen in FIG. 2). First notch 36 receives first post 52, second notch 38 receives second post 54, and third notch 40 receives third post 56. While engagement openings 32 are described as including first notch 36, second notch 38, and third notch 40, it is understood that engagement openings 32 may take any suitable form to mesh with projections 46, such as a rectangular opening without notches, or a series of notches without a common engagement opening.

Shoulder 34 extends circumferentially about second wall 30. Shoulder 34 rests flush against rim 48 (shown in FIG. 1) when camera adjustment mechanism 10 is in use and ensures that camera adjustment mechanism 10 is aligned perpendicular to axis C (shown in FIG. 1) of camera 58. In this way, shoulder 34 ensures that camera adjustment mechanism 10 is properly aligned while camera 58 is being oriented.

First wall 22 is preferably an angled wall. As stated above, camera 58 (best seen in FIG. 2) extends through second portion 16 when camera adjustment mechanism 10 is engaged. As such, angling first wall 22 prevents the FOV of the camera from being obstructed while camera adjustment mechanism 10 is in place. A camera of an aircraft security system typically has an FOV of about 90 degrees to about 105 degrees. Thus, an FOV through first portion 14 is preferably between about 90 degrees and about 110 degrees. It is understood, however, that first wall 22 may be angled in any suitable manner such that camera adjustment mechanism 10 does not obstruct the FOV of a camera having an FOV greater than 105 degrees.

FIG. 2 is a cross-sectional view of camera adjustment mechanism 10 and camera housing 12, showing camera adjustment mechanism 10 engaged with camera housing 12. Camera adjustment mechanism 10 includes first portion 14 and second portion 16. First portion 14 includes first end 18, second end 20, first wall 22, and grips 24. Second portion 18 includes third end 26, fourth end 28, second wall 30, engagement openings 32, and shoulder 34. Engagement openings 32 include first notch 36, second notch 38 and third notch 40. Camera housing 12 includes inner wall 42, outer wall 44, projections 46, rim 48, and grooves 50 (shown in FIG. 1). Projections 46 include first post 52, second post 54, and third post 56.

Grips 24 extend circumferentially around an outer edge of first end 18. Grips 24 allow a user to easily grasp and manipulate first end 18. First wall 22 extends between and connects first end 18 and second end 20. In the illustrated embodiment, first wall 22 is an angled wall, such that an internal diameter of first end 18 is greater than an internal diameter of second end 20. Second end 20 is connected to third end 26, to connect first portion 14 and second portion 16. Second wall 30 extends between and connects third end 26 and fourth end 28. Shoulder 34 extends circumferentially about an outer edge of second wall 30. Engagement openings 32 are disposed circumferentially about fourth end 28. Camera adjustment mechanism 10 is preferably made from a metallic material, such as aluminum or an aluminum alloy. It is understood, however, that camera adjustment mechanism 10 may be formed of any material having a suitable stiffness to engage and adjust an orientation of camera housing 12.

Camera housing 12 is generally hemispherical with an open end. Projections 46 are disposed circumferentially about inner wall 42. First post 52, second post 54, and third post 56 are each attached to inner wall 42 and extend axially from the open end of camera housing 12. Camera housing 12 installed in a camera cup 60 and the camera cup 60 is mounted in a wall panel 62. Camera housing 12 is preferably formed from a composite or plastic. It is understood, however, that camera housing 12 can be formed of any suitable material for housing and maintaining an orientation of a camera.

As shown, camera adjustment mechanism 10 fully engages camera housing 12 to orient a view of camera 58. Camera 58 is positioned within camera housing 12 along axis C and projects towards an open end of camera housing 12. Camera housing 12 is friction fit within camera cup 60. The friction fit allows camera housing 12 to be physically adjusted throughout the entire Cartesian coordinate system, to orient camera 58. Camera cup 60 is mounted within a wall panel 62. As such, camera housing 12 is not easily accessible from outside of the wall panel 62.

An orientation of camera housing 12 is adjusted with camera adjustment mechanism 10. The user removes a lens cap from camera housing 12, and the user inserts camera adjustment mechanism 10 into camera housing 12. When camera adjustment mechanism 10 is engaged with camera housing 12, engagement openings 32 mesh with projections 46. Each engagement opening 32 meshes with a projection 46 as first notch 36 receives first post 52, second notch 38 receives second post 54, and third notch 40 receives third post 56.

Shoulder 34 abuts rim 48 when camera adjustment mechanism 10 engages camera housing 12. Shoulder 34 lies flush against rim 48 to indicate that engagement openings 32 are fully engaged with projections 46. In this way, shoulder 34 acts as a mistake-proofing feature to ensure that camera adjustment mechanism 10 is properly aligned with camera 58, along axis C, during camera adjustment. Aligning camera adjustment mechanism 10 with camera 58 ensures that the camera 58 is properly oriented after adjustment. In addition, shoulder 34 limits the distance that second portion 16 can extend into camera housing 12 to prevent any inadvertent damage occurring to camera 58 or to any elements of the camera.

Camera 58 extends through second portion 16 when camera adjustment mechanism 10 is engaged with camera housing 12. First wall 22 of first portion 14 defines a maximum FOV that can be seen by the camera when camera adjustment mechanism 10 is engaged. As discussed above, first wall 22 is preferably an angled wall to allow camera 58 to view a full FOV. Providing a full FOV through first portion 14 ensures that the user can see the full FOV of camera 58 while camera adjustment mechanism 10 is engaged with camera housing 12.

Preventing the camera adjustment mechanism 10 from obstructing the FOV of camera 58 eliminates the iterative and time-consuming process required to orient cameras that have an FOV obstructed by a camera adjustment mechanism. By not obstructing the FOV of the camera while adjusting the camera orientation, the user does not have to remove the camera adjustment mechanism after an initial adjustment, determine the new orientation of the camera, reattached the camera adjustment mechanism, readjust the camera, remove the camera adjustment mechanism again, and re-determine the orientation of the camera, to iteratively adjust the camera orientation. Instead, camera adjustment mechanism 10 remains in place and the user can see the full FOV of the camera, which allows the user to make adjustments quickly and efficiently without having to remove camera adjustment mechanism 10 to determine the new orientation of the camera.

The user adjusts the orientation of the camera throughout the Cartesian coordinate system by manipulating camera adjustment mechanism 10. The user holds grips 24 and adjusts the orientation of camera 58 by moving camera adjustment mechanism 10. For example, where the camera presents a view that is rotationally distorted, the user can rotate camera adjustment mechanism 10 about the z-axis, which correspondingly rotates camera housing 12 and the camera. Similarly, where the camera presents a view that is distorted in the horizontally or vertically, the user can push camera adjustment mechanism 10 along the x-axis or the y-axis, which correspondingly pushes camera housing 12 and the camera along the x-axis or the y-axis to orient the view presented by the camera. The friction fit between camera housing 12 and camera cup 60 maintains camera housing 12 in a desired position to provide a desired view from camera 58.

Figure 3:
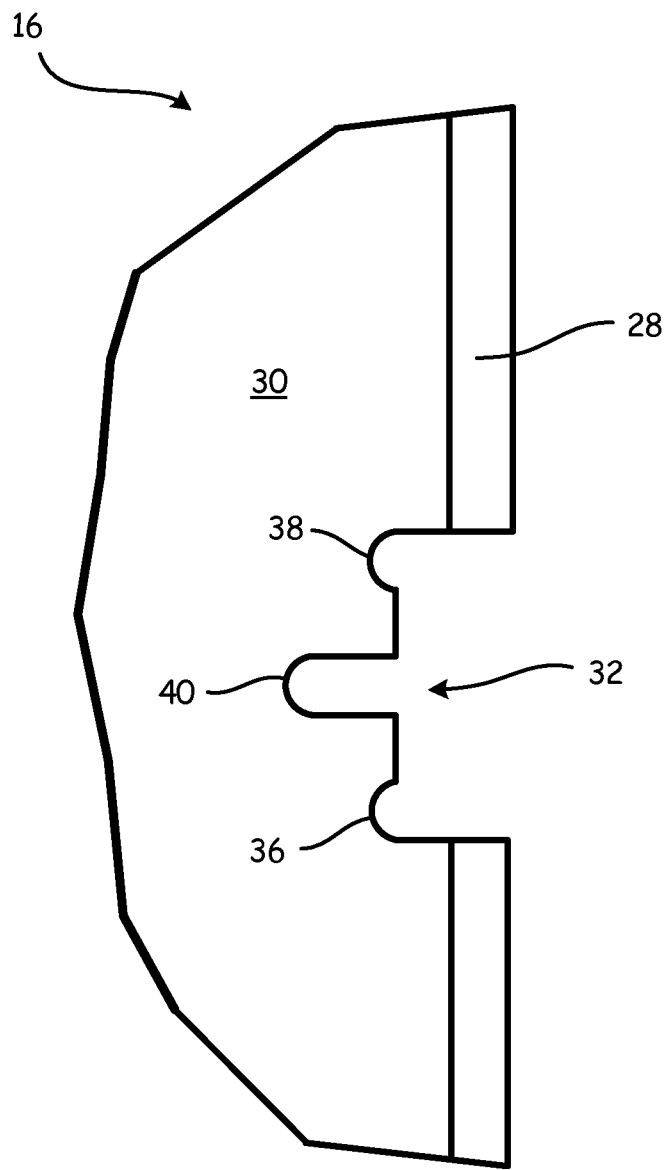
FIG. 3 is a plan view of an engagement opening.

FIG. 3 is a zoomed-in plan view of detail Z of FIG. 1 showing engagement opening 32, fourth end 28, and second wall 30. Engagement opening 32 includes first notch 36, second notch 38, and third notch 40.

Engagement opening 32 extends into second wall 30 from fourth end 28. First notch 36 extends towards third end 26 along second wall 30. Second notch 38 similarly extends towards third end 26 along second wall 30. Third notch 40 is disposed between first notch 36 and second notch 38, and similarly extends into second wall 30 towards third end 26. In the illustrated embodiment, third notch 40 has a greater axial length that first notch 36 and second notch 38.

Engagement openings 32 mesh with projections 46 (shown in FIG. 1) to allow camera adjustment mechanism 10 (best seen in FIG. 1) to engage with and manipulate an orientation of camera housing 12 (shown in FIG. 1). As camera adjustment mechanism 10 is adjusted to orient the camera, engagement openings 32, first notch 36, second notch 38, and third notch 40 exert a force on projection 46 (shown in FIG. 1) that causes camera housing 12 to shift in the desired direction to properly orient the camera.

Discussion of Possible Embodiments

The following are non-exclusive descriptions of possible embodiments of the present invention.

A camera adjustment mechanism includes a first portion and a second portion, the first portion has a first end, a second end, and a first wall extending between and connecting the first end and the second end, and the first wall is sloped such that an inner diameter of the first end is greater than an inner diameter of the second end, the second portion includes a third end connected to the second end, a fourth end, a second wall extending between and connecting the third end and the fourth end, and a plurality of engagement openings extending circumferentially about the fourth end.

The camera adjustment mechanism of the preceding paragraph can optionally include, additionally and/or alternatively, any one or more of the following features, configurations and/or additional components:

Each of the plurality of engagement openings include a first notch extending from the fourth end towards the third end, a second notch extending from the fourth end towards the third end, and a third notch extending from the fourth end towards the third end, the third notch disposed circumferentially between the first notch and the second notch.

The third notch has an axial length greater than an axial length of either the first notch or the second notch.

The fourth end includes a sloped edge.

A field of view through the first portion is between about 90 degrees and about 110 degrees.

A plurality of grips disposed circumferentially about the first end.

A shoulder disposed circumferentially about an outer edge of the second wall.

An aircraft surveillance system, the aircraft surveillance system comprising at least one camera cup mounted within an aircraft cabin; at least one camera housing movably disposed within the at least one camera cup, the at least one camera housing including an inner surface, an outer surface, a rim, and a plurality of projections disposed about the inner surface; at least one camera mounted within the at least one camera housing; and a camera adjustment mechanism capable of orienting a field of view of the at least one camera, the camera adjustment mechanism comprising a first portion a first end, a second end, and a first wall extending between and connecting the first end and the second end, and a second portion including a third end, the third end connected to the second end, a fourth end, and a plurality of engagement openings extending circumferentially about the fourth end, the plurality of engagement openings configured to engage the plurality of projections.

The aircraft surveillance system of the preceding paragraph can optionally include, additionally and/or alternatively, any one or more of the following features, configurations and/or additional components:

Each of the plurality of projections include a first post, a second post, and a third post disposed between the first post and the second post, the third post having a greater axial length than either the first post or the second post.

Each of the plurality of engagement openings include a first notch extending from the second distal end towards the second proximate end, a second notch extending from the second distal end towards the second proximate end, and a third notch extending from the second distal end towards the second proximate end, the third notch disposed circumferentially between the first notch and the second notch.

The plurality of engagement openings mesh with the plurality of projections;

The first wall is an angled wall.

An inner diameter of the first end is greater than an inner diameter of the second end.

A field of view of the at least one camera through the first portion when the camera adjustment mechanism is engaged with the at least one camera housing is greater than about 90 degrees.

The field of view of the at least one camera through the first portion when the camera adjustment mechanism is engaged with the at least one camera housing is between about 90 degrees and about 110 degrees.

A shoulder is disposed circumferentially about an outer edge of the second wall.

A method of adjusting the orientation of a camera in a surveillance system comprises determining an initial camera orientation; aligning a plurality of engagement notches with a plurality of engagement posts, the engagement notches disposed circumferentially about a distal end of the camera adjustment mechanism and the engagement posts disposed circumferentially around an interior surface of the camera housing; meshing the plurality of engagement notches with the plurality of engagement posts; and adjusting the initial camera orientation to a desired camera orientation.

The method of the preceding paragraph can optionally include, additionally and/or alternatively, any one or more of the following features, configurations and/or additional components:

Determining a vertical and horizontal alignment of the camera, and determining a rotational alignment of the camera.

Shifting the camera adjustment mechanism vertically or horizontally to correct the vertical and horizontal alignment of the camera, and rotating the camera adjustment mechanism about an axis of the camera to correct a rotational alignment of the camera.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A camera adjustment mechanism comprising:
   a first portion comprising:
      a first end;
      a second end; and
      a first wall extending between and connecting the first end and the second end, wherein the first wall is sloped such that an inner diameter of the first end is greater than an inner diameter of the second end; and
   a second portion comprising:
      a third end, the third end connected to the second end;
      a fourth end;
      a second wall extending between and connecting the third end and the fourth end;
      a shoulder disposed circumferentially about an outer edge of the second wall; and
      a plurality of engagement openings extending circumferentially about the fourth end.

2. The camera adjustment mechanism of claim 1, wherein each of the plurality of engagement openings comprise:
   a first notch extending from the fourth end towards the third end;
   a second notch extending from the fourth end towards the third end; and
   a third notch extending from the fourth end towards the third end, the third notch disposed circumferentially between the first notch and the second notch.

3. The camera adjustment mechanism of claim 2, wherein the third notch has an axial length greater than an axial length of either the first notch or the second notch.

4. The camera adjustment mechanism of claim 1, wherein the fourth end further comprises a sloped edge.

5. The camera adjustment mechanism of claim 1, wherein a field of view through the first portion is between about 90 degrees and 110 degrees.

6. The camera adjustment mechanism of claim 1, and further comprising:
   a plurality of grips disposed circumferentially about the first end.

7. An aircraft surveillance system comprising:
   at least one camera cup mounted within a wall;
   at least one camera housing movably disposed within the at least one camera cup, the at least one camera housing comprising:
      an inner surface;
      an outer surface;
      a rim; and
      a plurality of projections disposed about the inner surface of the camera housing, each of the plurality of projections comprising:
         a first post, a second post, and a third post, wherein the third post has a greater axial length than either the first post or the second post;
   at least one camera mounted within the at least one camera housing; and
   a camera adjustment mechanism capable of orienting a field of view of the at least one camera, the camera adjustment mechanism comprising:
      a first portion comprising:
         a first end;
         a second end; and
         a first wall extending between and connecting the first end and the second end; and
      a second portion comprising:
         a third end, the third end connected to the second end;
         a fourth end;
         a second wall extending between and connecting the third end and the fourth end; and
         a plurality of engagement openings extending circumferentially about the fourth end, the plurality of engagement openings configured to engage the plurality of projections.

8. The aircraft surveillance system of claim 7, wherein each of the plurality of engagement openings comprise:
   a first notch extending from the fourth end and into the second wall;
   a second notch extending from the fourth end and into the second wall; and
   a third notch extending from the fourth end and into the second wall, the third notch disposed circumferentially between the first notch and the second notch.

9. The aircraft surveillance system of claim 8, wherein the plurality of engagement openings mesh with the plurality of projections.

10. The aircraft surveillance system of claim 7, wherein the first wall is an angled wall.

11. The aircraft surveillance system of claim 10, wherein an inner diameter of the first end is greater than an inner diameter of the second end.

12. The aircraft surveillance system of claim 10, wherein a field of view of the at least one camera through the first portion when the camera adjustment mechanism is engaged with the camera housing is greater than about 90 degrees.

13. The aircraft surveillance system of claim 12, wherein a field of view of the at least one camera through the first portion when the camera adjustment mechanism is engaged with the camera housing is between about 90 degrees and about 110 degrees.

14. The aircraft surveillance system of claim 7, wherein the camera adjustment mechanism further comprises:
   a shoulder disposed circumferentially about an outer edge of the second wall.

15. The aircraft surveillance system of claim 7, wherein the camera adjustment mechanism further comprises:
   a plurality of grips disposed circumferentially about the first end.

16. A method of camera adjustment for an aircraft cabin surveillance system, the method comprising:
   determining an initial camera orientation;
   aligning a plurality of engagement notches with a plurality of engagement posts, the engagement notches disposed circumferentially about a distal end of a camera adjustment mechanism and the engagement posts disposed circumferentially around an interior surface of a camera housing;
   meshing the plurality of engagement notches with the plurality of engagement posts; and
   adjusting the initial camera orientation to a preferred camera orientation.

17. The method of claim 16, wherein determining the initial camera orientation further comprises:
   determining a vertical and horizontal alignment of the camera; and
   determining a rotational alignment of the camera.

18. The method of claim 16, wherein adjusting the camera orientation to a preferred camera orientation further comprises:
   shifting the camera adjustment mechanism in the vertical direction or the horizontal direction to correct the vertical and horizontal alignment of the camera; and
   rotating the camera adjustment mechanism about an axis of the camera adjustment mechanism to correct the rotational alignment of the camera.

* * * * *